(12) United States Patent
Adler

(10) Patent No.: US 7,170,852 B1
(45) Date of Patent: Jan. 30, 2007

(54) MESH WITH PROJECTION CHANNEL ACCESS (MPCA)

(75) Inventor: John C. Adler, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 656 days.

(21) Appl. No.: 09/676,743

(22) Filed: Sep. 29, 2000

(51) Int. Cl.
*H04J 3/14* (2006.01)
*H04L 12/28* (2006.01)

(52) U.S. Cl. .................... 370/223; 370/218; 370/907
(58) Field of Classification Search ........ 370/216–228, 370/351, 389, 395.1, 399.51, 395.52, 907
See application file for complete search history.

(56) References Cited

U.S. PATENT DOCUMENTS

| | | | | |
|---|---|---|---|---|
| 4,956,835 A * | 9/1990 | Grover | ................... | 370/228 |
| 5,412,652 A * | 5/1995 | Lu | ................... | 370/223 |
| 5,506,833 A * | 4/1996 | Nemoto | ................... | 370/228 |
| 5,537,393 A * | 7/1996 | Shioda et al. | ................... | 370/223 |
| 5,550,805 A * | 8/1996 | Takatori et al. | ................... | 370/222 |
| 5,646,936 A * | 7/1997 | Shah et al. | ................... | 370/228 |
| 6,324,162 B1 * | 11/2001 | Chaudhuri | ................... | 370/225 |
| 6,370,110 B1 * | 4/2002 | Eslambolchi | ................... | 370/216 |
| 6,473,397 B1 * | 10/2002 | Au | ................... | 370/223 |
| 6,512,740 B1 * | 1/2003 | Baniewicz et al. | ................... | 370/216 |
| 6,587,235 B1 * | 7/2003 | Chaudhuri et al. | ................... | 370/216 |
| 6,643,464 B1 * | 11/2003 | Roorda et al. | ................... | 398/59 |
| 6,728,205 B1 * | 4/2004 | Finn et al. | ................... | 370/217 |
| 6,735,392 B1 * | 5/2004 | Elahmadi et al. | ................... | 398/7 |
| 6,763,190 B2 * | 7/2004 | Agrawal et al. | ................... | 398/5 |
| 6,795,394 B1 * | 9/2004 | Swinkels et al. | ................... | 370/222 |
| 6,848,006 B1 * | 1/2005 | Hermann | ................... | 709/239 |
| 6,870,813 B1 * | 3/2005 | Raza et al. | ................... | 370/238 |
| 6,934,248 B1 * | 8/2005 | DeBoer et al. | ................... | 370/217 |
| 2001/0038471 A1 * | 11/2001 | Agrawal et al. | ................... | 359/110 |

* cited by examiner

*Primary Examiner*—Doris H. To
*Assistant Examiner*—Ahmed Elallam
(74) *Attorney, Agent, or Firm*—Campbell Stephenson Ascolese LLP

(57) ABSTRACT

A method for a communications network with a protect channel transmitting protect channel data and working channel transmitting working channel data includes transmitting the working channel data via the protect channel upon a disruption in the working channel, and restoring the transmitting of protect channel data, wherein the restoring includes applying a mesh restoration protocol to the communications network to restore the transmittal of the protect channel data. The restoring includes finding one or more alternate channels to transmit the protect channel data, the one or more alternate channels including connected working and protect channels. An apparatus disposed in a communication network having a protect channel and a working channel includes a node controller, a route processor coupled to the node controller, the route processor implementing a mesh restoration protocol, and a circuit coupled to the node controller and the route processor, the circuit including a logic gate for receiving signals identifying disruptions in transmissions in the protect channel and the working channel and a switch responsive to the signals identifying disruptions in transmissions in the protect channel and the working channel, the switch communicating with the route processor to implement mesh restoration of protect channel data. In one embodiment, the circuit is coupled to at least one line card, the line card transmitting the signals identifying disruptions in transmissions in the protect channel and the working channel. The circuit further includes an input/output circuit for receiving instructions identifying criteria for applying mesh restoration to protect channel data.

29 Claims, 7 Drawing Sheets

MESH WITH PROJECTION CHANNEL ACCESS (MPCA)

CROSS-REFERENCES TO RELATED APPLICATIONS

This application is related to patent application Ser. No. 09/232,397, entitled "A CONFIGURABLE NETWORK ROUTER," having A. Saleh, H. M. Zadikian, J. C. Adler, Z. Baghdasarian, and V. Parsi as inventors, filed on Jan. 15, 1999. This related application is assigned to Cisco Systems, Inc., the assignee of the present invention, and is hereby incorporated by reference in its entirety.

This application is related to Patent Application Ser. No. 09/232,395, entitled "A METHOD FOR ROUTING INFORMATION OVER A NETWORK," having Zareh Baghdasarian, Vahid Parsi, Ali Saleh, and Michael H. Zadikian as inventors, filed on Jan. 15, 1999. This related application is assigned to Cisco Systems, Inc., the assignee of the present invention, and is hereby incorporated by reference in its entirety.

BACKGROUND OF THE INVENTION

1. Field of the Invention

This invention relates to the field of information networks, and more particularly relates to a protocol for configuring routes over a network for protection channel communication.

2. Description of the Related Art

Today's networks carry vast amounts of information. High bandwidth applications supported by these networks include streaming video, streaming audio, and large aggregations of voice traffic. In the future, these demands are certain to increase. To meet such demands, an increasingly popular alternative is the use of lightwave communications carried over fiber optic cables. The use of lightwave communications provides several benefits, including high bandwidth, ease of installation, and capacity for future growth.

The synchronous optical network (SONET) protocol is among those protocols employing an optical infrastructure. A similar standard to SONET is the Synchronous Digital Hierarchy (SDH) which is the optical fiber standard predominantly used in Europe. There are only minor differences between the two standards. Accordingly, hereinafter any reference to the term SONET refers to both SDH and SONET networks, unless otherwise noted. SONET is a physical transmission vehicle capable of transmission speeds in the multi-gigabit range, and is defined by a set of electrical as well as optical standards. SONET's ability to use currently-installed fiber optic cabling, coupled with the fact that SONET significantly reduces complexity and equipment functionality requirements, gives local and inter-exchange carriers incentive to employ SONET. Also attractive is the immediate savings in operational cost that this reduction in complexity provides. SONET thus allows the realization of a new generation of high-bandwidth services in a more economical manner than previously existed.

SONET networks have traditionally been protected from failures by using topologies that dedicate something on the order of half the network's available bandwidth for protection, such as a ring topology. Two approaches in common use today are diverse protection and self-healing rings (SHR), both of which offer relatively fast restoration times with relatively simple control logic, but do not scale well for large data networks. This is mostly due to their inefficiency in capacity allocation. Their fast restoration time, however, makes most failures transparent to the end-user, which is important in applications such as telephony and other voice communications. The existing schemes rely on 1-plus-1 and 1-for-1 topologies that carry active traffic over two separate fibers (line switched) or signals (path switched), and use a protocol (Automatic Protection Switching or APS), or hardware (diverse protection) to detect, propagate, and restore failures.

A SONET network using an SHR topology provides very fast restoration of failed links by using redundant links between the nodes of each ring. Thus, each ring actually consists of two rings, a ring supporting information transfer in a "clockwise" direction and a ring supporting information transfer in a "counter-clockwise" direction. The terms "east" and "west" are also commonly used in this regard. Each direction employs its own set of fiber optic cables, with traffic between nodes assigned a certain direction (either clockwise or counter clockwise). If a cable in one of these sub-rings is damaged, the SONET ring "heals" itself by changing the direction of information flow from the direction taken by the information transferred over the failed link to the sub-ring having information flow in the opposite direction.

The detection of such faults and the restoration of information flow thus occurs very quickly, on the order of 10 ms for detection and 50 ms for restoration for most ring implementations. The short restoration time is critical in supporting applications, such as current telephone networks, that are sensitive to quality of service (QoS) because it prevents old digital terminals and switches from generating red alarms and initiating Carrier Group Alarms (CGA). These alarms are undesirable because such alarms usually result in dropped calls, causing users down time aggravation. Restoration times that exceed 10 seconds can lead to timeouts at higher protocol layers, while those that exceed 1 minute can lead to disastrous results for the entire network. However, the price of such quickly restored information flow is the high bandwidth requirements of such systems. By maintaining completely redundant sub-rings, an SHR topology requires 100% excess bandwidth.

An alternative to the ring topology is the mesh topology. The mesh topology is similar to the point-to-point topology used in inter-networking. Each node in such a network is connected to one or more other nodes. Thus, each node is connected to the rest of the network by one or more links. In this manner, a path from a first node to a second node uses all or a portion of the capacity of the links between those two nodes.

Networks based on mesh-type restoration are inherently more capacity-efficient than ring-based designs, mainly because each network link can potentially provide protection for fiber cuts on several different links. By sharing the capacity between links, a SONET network using a mesh topology can provide redundancy for failure restoration at less than 100% of the bandwidth capacity originally required. Such networks are even more efficient when traffic transits several links. One study found that for an 11-node, 22-span network, only 51% redundant net capacity was required for 100% restorability, as reported in, "The design and simulation of an intelligent transport network with distributed control," by T. Chujo, H. Komine, K. Miyazaki, T. Ogura, and T. Soejima, presented at the Network Operations Management Symposium, San Diego, Feb. 11–14, 1990, which is included herein by reference, in its entirety and for all purposes. The corresponding ring-based design required five rings and a total DS-3 redundancy of 330%.

However, path restoration often consumes several minutes in such a topology. This is much slower than the restoration times exhibited by ring topologies and is so long that connections are often lost during the outage.

Various kinds of networking equipment can be used to support the ring and mesh topologies just described. Options include:

1. Back-to-back wavelength division multiplexers (WDMs) and optical cross connects (OXCs) for use in mesh topologies.
2. Back-to-back optical add/drop multiplexers (O-ADM) for ring topologies.
3. Other combinations (e.g., WDM combined with OXC, digital cross connect systems (DCSs), and other such equipment)

WDMs may be connected in back-to-back configurations to allow the connection of various wavelength routes to one another (also known as "patching" or "nailing up" connections). Provisioning paths in such architectures is done manually using a patch panel. Thus, provisioning is slow and prone to mistakes due to human error and equipment failure. In the event of a failure, restoration is performed manually in such architectures, and is again slow and error-prone. Such architectures scale poorly because additional bandwidth is added by either adding to the number of wavelengths supported (requiring the replacement of equipment at nodes, and possibly the replacement of fiber optic cables as well) or adding new fiber optic cables and supporting node equipment. Such architectures are also inherently unmanageable, due to the lack of centralized control. And while the initial capital investment tends to be relatively low (as a result of their simplicity), operating expenses for such architectures tends to be relatively high because of the costs associated with configuration, expansion, and management. Thus, a mesh topology employing back-to-back WDMs will tend to be slow to deploy and difficult to manage due to the need for manually "nailing up" paths and lack of centralization.

Another architectural element that may be used to create a mesh topology is the optical cross connect (OXC). OXCs allow provisioning using a centralized scheme to accomplish provisioning in a matter of minutes. Restoration in the event of a failure may be performed manually or may be effected using a centralized management system. However, restoration still requires on the order of minutes per wavelength route restored. As with the back-to-back WDM architecture, a mesh topology that employs OXCs scales poorly due, in part, to the large increase in size and cost such scaling entails.

An OXC can be either transparent (purely optical, in which the signals are never converted from optical signals) or opaque (in which the optical signals are converted from optical signals into electrical signals, switch, and then converted back into optical signals). Transparent optical cross connects provide little in the way manageability because the information is never made accessible to the OXC's operator. In contrast, opaque OXCs can be configured to permit access to the information being switched. However, neither type of OXC maintains information regarding the topology of the network and, in fact, OXCs possess no intrinsic network intelligence. Moreover, OXC technology is expensive, making initial investment quite high, as well as the cost of future expansion.

Alternatively, a SONET network may be configured in a ring (SHR) topology by using add/drop multiplexers (ADMs). An ADM is a SONET multiplexer that allows signals to be added into or dropped from a higher rate signal. ADMs have two bidirectional ports, commonly referred to as an east and a west port. Using ADMs, a SONET network in a SHR topology uses a collection of nodes equipped with ADMs in a physical closed loop such that each node is connected to two adjacent nodes with a duplex connection. Any loss of connection due to a single failure of a node or a connection between nodes is automatically restored. The traffic terminated at a failed node, however, is lost. Two types of SHRs are unidirectional (UPSR) and bidirectional (BLSR), as defined by the traffic flow in normal conditions. Bidirectional rings have a capacity carrying advantage over unidirectional rings because of the ability to share protection capacity among the links between nodes, as opposed to unidirectional rings, which dedicate capacity all the way around the ring.

Provisioning in such architectures is centralized and can be performed in minutes. While restoration can also be performed quickly (on the order of 50 ms, as previously noted), 100% spare bandwidth is required. For all intents and purposes, then, the user must install fiber optic cabling for two networks, one for normal traffic and one to be used in the event of a failure. Moreover, the cabling for each link should be physically diverse in order to minimize the possibility that a cause of physical damage will damage both links and cause both directions of a ring to fail. These issues detrimentally affect cost, manageability, and scalability. With regard to expansion, ADMs are stacked in an SHR in order to increase capacity. However, stacked ADMs are blocking. In other words, the switching function may not be transparent as a result of the ADMs not being available on a full-time basis (i.e., occasionally blocking). Thus, an architecture employing ADMs is best suited for small offices or other situations that do not require the relatively large amounts of bandwidth (implying the need for stacked ADMs). As noted, stacked ADMs are also difficult to manage and expensive due to the extra hardware required for 100% spare capacity.

Other combinations can also be employed. For example, WDMs can be combined with OXCs (either transparent or opaque) in order to create a network having a mesh topology. Such an architecture supports the cross-connection of wavelength routes by either manual connection or under centralized control. However, such an architecture is also difficult to expand due to the need to add WDMs/fiber optic cables and the increase in size of the OXC, and cannot restore failed links quickly enough to avoid dropping or interrupting telecommunications connections.

Another option is the use of a digital cross-connect system (DCS). A DCS is used to terminate digital signals and cross-connect them, integrating multiple functionalities such as signal adding and dropping, cross-connection capabilities, and multiplexing and demultiplexing of signals. DCS based networks enjoy an advantage over networks employing back-to-back WDMs because the use of DCS eliminates the need for additional back-to-back electrical multiplexing, thus reducing the need for labor-intensive jumpers. Operational cost savings are realized by a DCS through electronically controlling cross-connections, test access and loopbacks, and maintenance. Two types of DCSs are wideband DCSs and broadband DCSs. Wideband DCS (W-DCS) terminates full duplex OC-Ns and DS3s, has VT cross-connection capability, and provides DS1 interfaces. A broadband DCS (B-DCS) terminates full-duplex OC-N signals and provides DS3 interfaces. The B-DCS makes two-way cross connection at the DS3, STS-1, and concatenated STS-Nc levels. STS-Nc may be used, for example, in broadband services such as high definition television (HDTV), where an STS-3c cross connection may be used to cross connect the signal as a single, high-capacity channel.

Thus, as described above, communications providers have a number of different techniques available to provide network restoration in the event of a failure. The SONET ring architectures described above generally provide protection switching in less than 50 msec, provided the maximum number of nodes in the ring, or the circumference as specified in the standard is not exceeded.

The SONET provisioning for automatic protection and reconfiguration in case of failure is called APS (Automatic Protection Switching), and MSP (Multiplex Section Protection) in the SDH systems. Both APS/MSP configuration refer to the redundant systems as those that include at least one protection interface circuit and at least one working interface circuit. One such APS configuration is known as "1+1 linear APS". In a 1+1 linear APS configuration, any data transmitted by a network element is transmitted to both the working circuit and the protect circuit connected to the network element.

When routers are configured as network elements in a SONET system configured for APS, the interface circuits connecting the routers to the working and protect circuits may be configured to be located in separate routers or the same router. Protection occurs at the SONET line level (in SDH terminology, protection occurs at the SDH section level). Protection control bytes transmitted between line terminating equipment LTEs, the end points of a SONET line, communicate APS protection information. This protection information relates to whether the protect or working circuit is currently active for transmitting working channel data. Normally, when all equipment is functioning correctly, traffic is carried by the working circuit. In APS configurations involving routers, the working interface is active and the protect interface is inactive. If the working circuit fails, an "APS switch" occurs, causing deactivation of the working circuit and activation of the protect circuit. In APS configurations involving routers, the working interface is deactivated and the protect interface is activated.

SONET architectures with redundant transmission paths require both working and protection equipment to transmit the same payloads identically to tail-end working and protection equipment. The receiving equipment chooses either the working or the protection signal as the one from which to select traffic based on switch initiation criteria. Typically, SONET architectures do not allow unprotected extra traffic to be provided. Another architecture similar to the 1+1 architecture is the 1:n architecture, which requires that any of "n" working channels be bridged to a single protection line. In each architecture that requires working and protection equipment, a working and dedicated protect path is provided whereby traffic is switched between these facilities on an as needed basis. In this approach, the protect path is unutilized and kept available for network restoration.

Although the protect path is typically unutilized and available, the SONET Specification permits the protection channel described above to be used for traffic on a preemptable basis for pre-defined architectures in what is referred to as protection channel access (PCA). However, traffic over the protection channel is dropped and not recovered until the initial cause of the failure is corrected. Thus, service providers do not utilize the protection channel due to the inherent lower availability of services to customers. What is needed is a system and method of using the protection channel for services that is more robust in the event of a working channel failure.

SUMMARY OF THE INVENTION

A method and apparatus employs mesh restoration to protect channel data, thereby maintaining network reliability while substantially increasing the traffic carrying capacity of a network. The mesh restoration increases overall capacity of a network by 30–70% with no additional cost in fiber plant or dense wave division multiplexing (DWDM) costs. More particularly, an apparatus and method is presented for a communications network that includes a protect channel transmitting protect channel data and working channel transmitting working channel data. The method includes transmitting the working channel data via the protect channel upon a disruption in the working channel, and restoring the transmitting of protect channel data, wherein the restoring includes applying a mesh restoration protocol to the communications network to restore the transmittal of the protect channel data. The restoring includes finding one or more alternate channels to transmit the protect channel data, the one or more alternate channels including connected working and protect channels.

In one embodiment, the communication network includes a plurality of interconnected nodes that transmit a disruption signal upon receiving a signal indicating the disruption, the disruption signal flooding the communication network to determine alternate routes for the protect channel data, the interconnected nodes having at least one of a working channel and a protect channel.

In another embodiment, the mesh restoration protocol includes communicating status and control messages across a physical network layer of the communication network using SONET frame overhead bytes. Another embodiment includes communicating status and control messages across out-of-band communication channels. In either embodiment, the status and control messages are communicated via either centralized or distributed intelligence.

One embodiment is directed to an apparatus disposed in a communication network having a protect channel and a working channel. The apparatus includes a node controller, a route processor coupled to the node controller, the route processor implementing a mesh restoration protocol, and a circuit coupled to the node controller and the route processor, the circuit including a logic gate for receiving signals identifying disruptions in transmissions in the protect channel and the working channel and a switch responsive to the signals identifying disruptions in transmissions in the protect channel and the working channel, the switch communicating with the route processor to implement mesh restoration of protect channel data.

In one embodiment, the circuit is coupled to at least one line card, the line card transmitting the signals identifying disruptions in transmissions in the protect channel and the working channel. The circuit further includes an input/output circuit for receiving instructions identifying criteria for applying mesh restoration to protect channel data. For example, in one embodiment the criteria are a function of the type of data being transmitted as the protect channel data, such as voice, video and internet protocol (IP) data.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
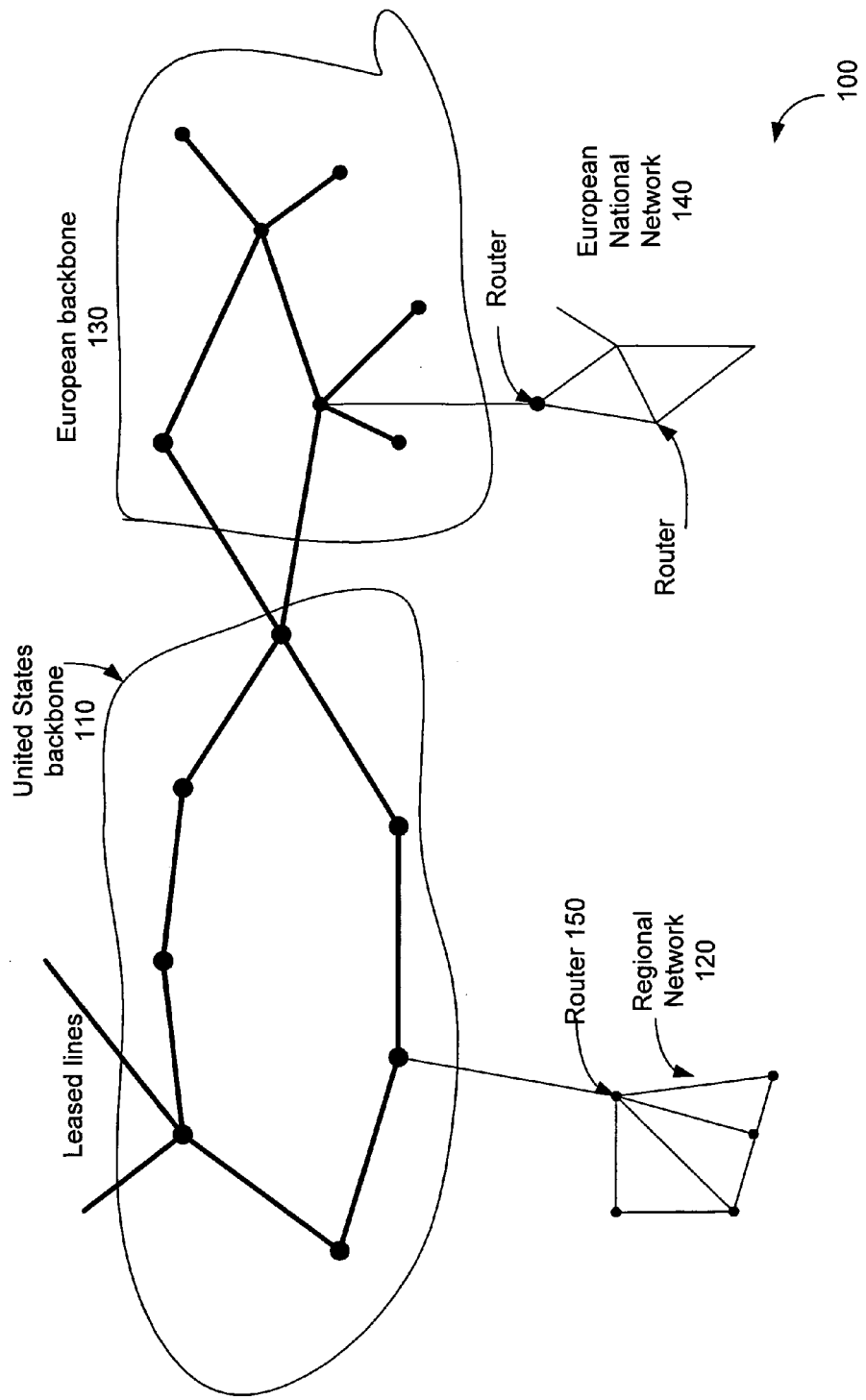
FIG. 1 illustrates a communications network for transmitting SONET/SDH signals.

Referring to FIG. 1, block representation of a Synchronous Digital Hierarchy (SDH)/Synchronous Optical NETwork (SONET) communication system 100 shows a communications network including fiber optic networks. The network includes a United States backbone network 110 and a European backbone 130 networked together with a regional-level network 120 and a European national-level network 140. Networks 120 and 140 include "Wide Area Networks" (WANs) that also include fiber optic networks. Attached to the regional-level networks 120 could be "Local Area Networks" (LANs). The communication system 100 includes networks following the SONET or the SDH protocols for transmitting data organized into SONET or SDH frames.

Referring to Table 1, a portion of a SONET frame, 9 rows and 270 columns, shows the organization of a SONET OC-3c (concatenated) frame, according to the BellCore STS-3c standard for SONET, which is incorporated herein by reference. The frames are transmitted row by row, from top to bottom, column byte by byte, 8000 frames/sec.

The OC-3c designation indicates that the carrier is not multiplexed, but carries data from a single source. Thus, the data stream is from a single source at 155.52 Mbps with three OC-1 streams within an OC-3c stream interleaved by column. The interleaving of streams produces a frame 270 columns wide and 9 rows deep. An OC-3c stream produces more actual user data than an OC-3 stream due to the path overhead column being included inside an SPE once instead of three times as is the case for three independent OC-1 streams. Accordingly, as shown in Table 1, 260 of the 270 columns within the frame are available for user data in OC-3c as compared to 258 columns available in OC-3. A similar protocol to OC-3c is provided for European systems in ITU G.783. Although the OC-3 standard is presented, one of ordinary skill in the art with the benefit of the disclosure herein appreciates that the embodiments herein described apply to other SONET and SDH standards.

As shown in Table 1, the first ten bytes of a SONET OC-3c frame constitute transport overhead, followed by 260 bytes of Synchronous Payload Envelope. The ten bytes of transport overhead include section overhead, line overhead and path overhead bytes. In general, certain bytes of the transport overhead only travel between each section, and are reconfigured at each section boundary. Other transport overhead bytes travel through section boundaries and are reconfigured at line boundaries. For example, an Add-Drop Multiplexer (ADM) receiving a SONET frame will interpret the line overhead bytes. These line overhead bytes will not be sent on through the network. Instead, the ADM generates new line overhead bytes for transport through the network. Unlike the line overhead and section overhead bytes, path overhead bytes are received and interpreted at the ends of a path. Accordingly, frames received by an ADM will neither remove nor reconfigure path overhead bytes.

Figure 2:
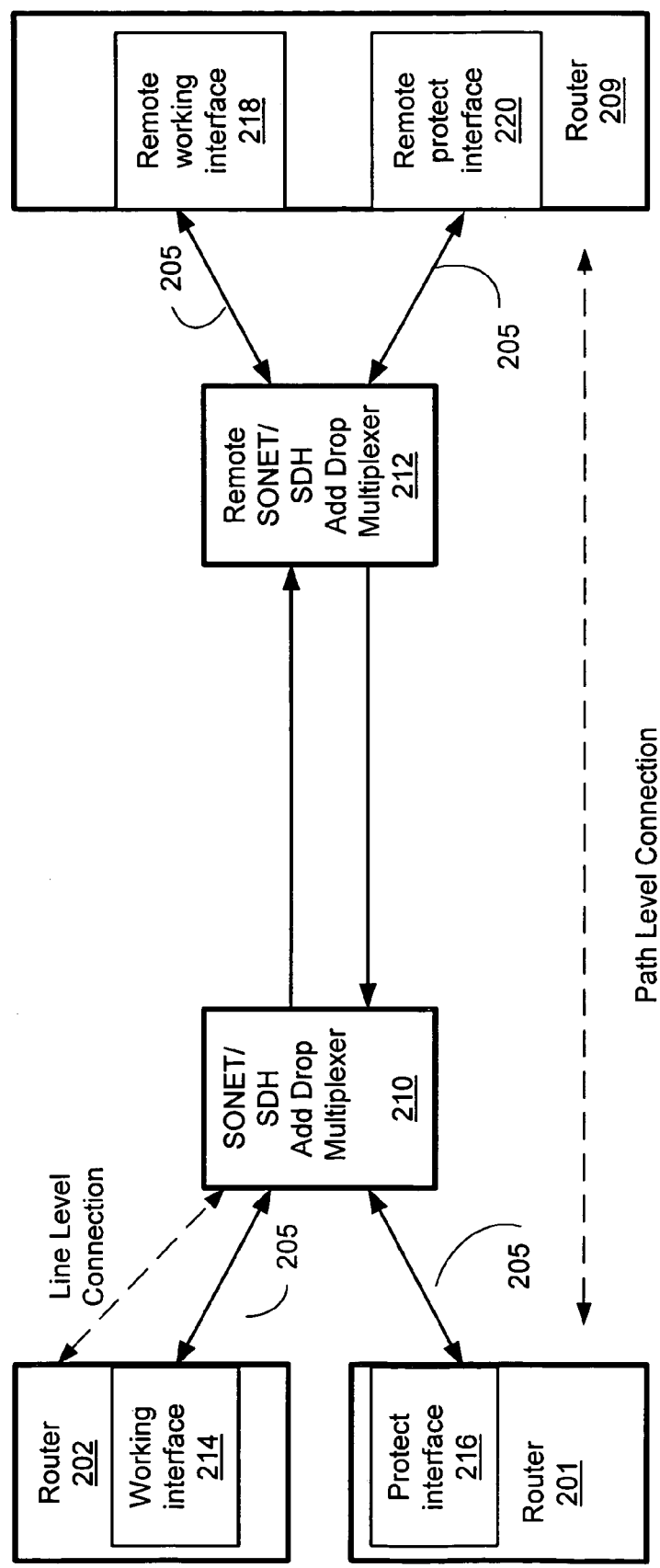
FIG. 2 illustrates a 1+1 linear APS system.

Referring now to FIG. 2, a SONET network is shown implementing a 1+1 linear APS system, in each of two locations, one local and one remote. In both locations, the line overhead bytes are received and regenerated anew by the line terminating equipment (LTE) at the ends of SONET lines. As shown, a first Add-Drop Multiplexer (ADM) 210 is connected via one or more SONET/SDH fiber optic lines to a second ADM 212. Each of ADM 210 and ADM 212 are coupled to at least one router via a SONET fiber optic line 205. For example, ADM 210 is shown coupled via SONET fiber optic line 205 to working interface 214 housed in router 202. ADM 210 is also coupled via another fiber optic line 205 to and protect interface 216 housed in router 201. Working interface 214 and protect interface 216 optionally may be housed in the same router. ADM 212 is shown coupled via SONET fiber optic line 205 to remote working interface 218; ADM 212 is also coupled via another fiber optic line 205 to remote protect interface 220. Both remote

TABLE 1

|  |  |  |  |  |  |  |  |  |  |  | ←----- 270 Bytes ----- |
|  |  |  | ←------ 9 Bytes ------→ | \|<1B>\| | ←------ 260 Bytes ----- |
| SOH | A1 | A1 | A1 | A2 | A2 | A2 | J0 | Z0 | Z0 | J1 | Synchronous Payload |
|  | B1 |  |  | E1 |  |  | F1 |  |  | B3 | Envelope (SPE) |
|  | D1 |  |  | D2 |  |  | D3 |  |  | C2 | (9 Bytes × 260 Bytes) |
| Point | H1 | H1 | H1 | H2 | H2 | H2 | H3 | H3 | H3 | G1 |  |
| LOH | B2 | B2 | B2 | K1 |  |  | K2 |  |  | F2 |  |
|  | D4 |  |  | D5 |  |  | D6 |  |  | H4 |  |
|  | D7 |  |  | D8 |  |  | D9 |  |  | Z3 |  |
|  | D10 |  |  | D11 |  |  | D12 |  |  | Z4 |  |
|  | S1 | Z1 | Z1 | Z2 | Z2 | M1 | E2 |  |  | Z5 |  |

NOTE:
(Section Overhead (SOH) (3 × 9 Bytes), + Pointer (1 × 9 Bytes), + Line Overhead (LOH) (5 × 9 Bytes), + Path Overhead (POH) (9 × 1 Bytes),) = Transport Overhead for OC-3c (STS-3c) Frames. The POH is the 10th Byte in each of the 9 rows (J1, B3, C2, G1, F2, H4, Z3, Z4, Z5).

working interface 218 and remote protect interface 220 are housed in router 209. Each of the interfaces, 214, 216, 218 and 220 are SONET path terminating equipment (PTE) interfaces.

Normally, in 1+1 linear APS, ADM 210 bridges all data to be transmitted to the working and protect interface circuits 214 and 216 via the fiber optic lines 205.

In system terminology, the connection between router 202 and ADM 210 is a line level connection. The connection between router 201 and router 209 is a path level connection. The connection between an ADM such as ADM 210 and any other elements in a SONET network consists of one or more line level connections.

A routing protocol running in each router, such as the higher-level routing protocols "Intermediate System to Intermediate System" (IS—IS), or "Border Gateway Protocol" (BGP), based on the Internet Protocol (IP), maintains one or more routing tables. The routing tables associate outgoing interfaces with destination network addresses. Ideally, when a network configuration changes, as it does because of an APS switch, every involved router receives immediate notification of the new configuration.

Referring now to Table 1 and FIG. 2 in combination, the "line" overhead bytes for a SONET system include bytes designated "K1" and "K2". These bytes provide a communication channel for carrying information related to Automatic Protection Switching (APS). Byte K2 is also used to carry line layer maintenance signals.

According to the SONET specification for a 1+1 linear APS or MSP system, any data transmitted to ADM 210 from ADM 212 is transmitted to working interface 214 housed in router 202 and to the protect interface 216 also housed in router 201. Likewise, ADM 212 transmits data to the remote working interface 218, and to remote protect interface 220, both housed in router 209. A SONET network implementing APS uses bytes K1 and K2 in the line overhead portion of the frame to identify the interface, either working or protect, from which an ADM is currently receiving data. Thus, for example, ADM 210 bridges all transmissions equally to two separate interfaces, working interface 214 and protect interface 216, but "listens" to only one of the two interfaces. The working and protect interfaces 214 and 216 are managed by logic running in the router containing the protect interface, such as router 201, which contains protect interface 216. The APS logic activates for transmitting only the interface currently selected for "listening" by the ADM. The non-selected interface is held in a "Protocol Down" state by the router to prevent transmission of data packets on the circuit. For example, if ADM 210 selects the working interface 214, the APS logic in router 201 commands router 202 to activate the working interface 214. Regardless of whether a protect interface or a working interface is currently selected, the protect interface 216 conducts an ongoing protocol dialog with ADM 210, using SONET bytes K1 and K2 or appropriate SDH bytes in the line overhead.

The SONET Specification permits the protection channel to be used for traffic on a preemptable basis for pre-defined architectures in what is referred to as protection channel access (PCA). Generally, however, traffic over the protection channel is dropped and not recovered.

Alternative Restoration Topologies

Mesh network topologies are an alternative approach for restoration of communications networks. Mesh networks share protection bandwidth across all facilities instead of dedicating protection bandwidth. In this manner, the protection routes change with the configuration and working state of the underlying services.

According to an embodiment, the mesh restoration topology is used in conjunction with working and protect equipment. More specifically, a protection paradigm hereinafter referred to as Mesh Protection Channel Access (MPCA) allows carriers to use SONET rings that have protect and working rings and SONET ring protection channel access without the penalty of dropping traffic when the rings preempt the protection channel. For example, a communications provider builds a mesh restoration topology connected to the PCA channels of the SONET rings. As a result, the overall capacity of a network to transmit voice, video and data increases without degradation during network failures.

Figure 3:
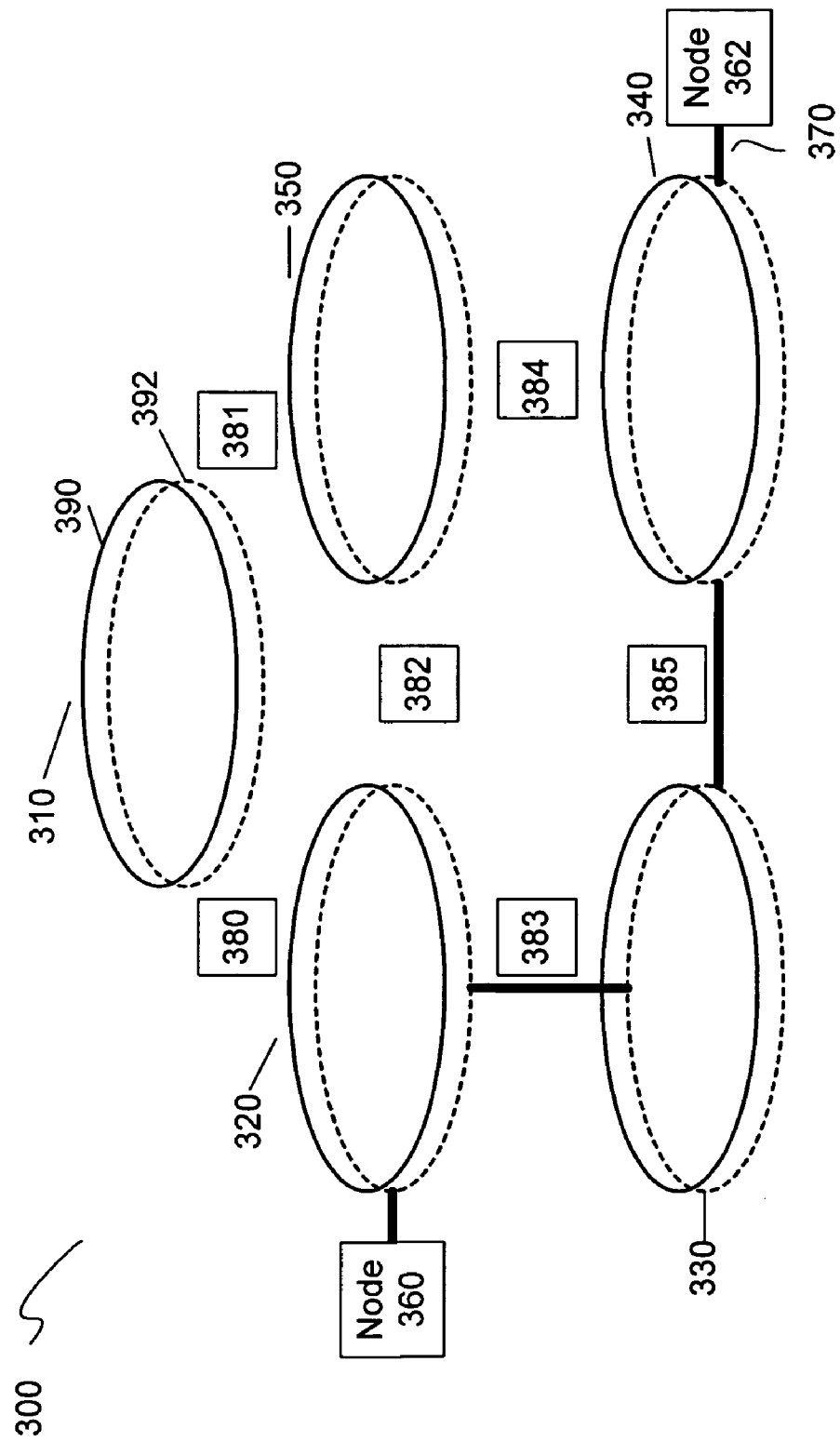
FIG. 3 illustrates a mesh network configuration in accordance with an embodiment of the present invention.

Referring to FIG. 3, a block diagram illustrates an architecture in accordance with an embodiment. As shown, FIG. 3 shows a mesh network configuration 300 including routing structures 310, 320, 330, 340 and 350. Each of the routing structures include either ring or similar topologies of network nodes, such as node 360 and node 362. More specifically, each routing structure, as shown in structure 310 includes a working ring 390 and a protection ring 392. The working ring 390 transmits working channel data and the protection ring 392 transmits protect channel data such as the protection channel access data. Protection ring 392 further transmits working data where predetermined criteria are met. For example, an APS switch could be one of the criteria used to determine whether to implement restoration of protect channel data. The routing structures are further connected through interfaces 380 through 385, which could be nodes or multiplexers or some other type of routing structure. For example, routing structures include wavelength routers, digital cross-connects, optical cross-connects, IP routers, and asynchronous transfer mode (ATM) switches. Each routing structure contributes to forming a mesh network of routing structures.

FIG. 3 further shows route 370 as a path for PCA between node 360 and node 362. More specifically, route 370 transmits SONET packets between node 360 and node 362 via the PCA network including ring 320, ring 330 and ring 340, routing interfaces 383 and 385.

During a network failure, if a SONET ring switch occurs, such as an APS switch, the protection channel traffic is dropped on those facilities by the SONET architecture. More particularly, a network failure includes occurrences such as a fiber cut, multiple equipment failures, "chopped" channel characteristics, degradation of service, noisy channel and the like resulting in a determination by the network that a failure occurred. A failure typically results in a loss of signal (LOS) message across the network and typically causes automatic switching to occur. A network failure includes at least one of a section level, a line level or a path level failure of equipment. However, as other failures related to quality of service (QOS) also affect transmission lines and are generally related to bit error rates.

Figure 4:
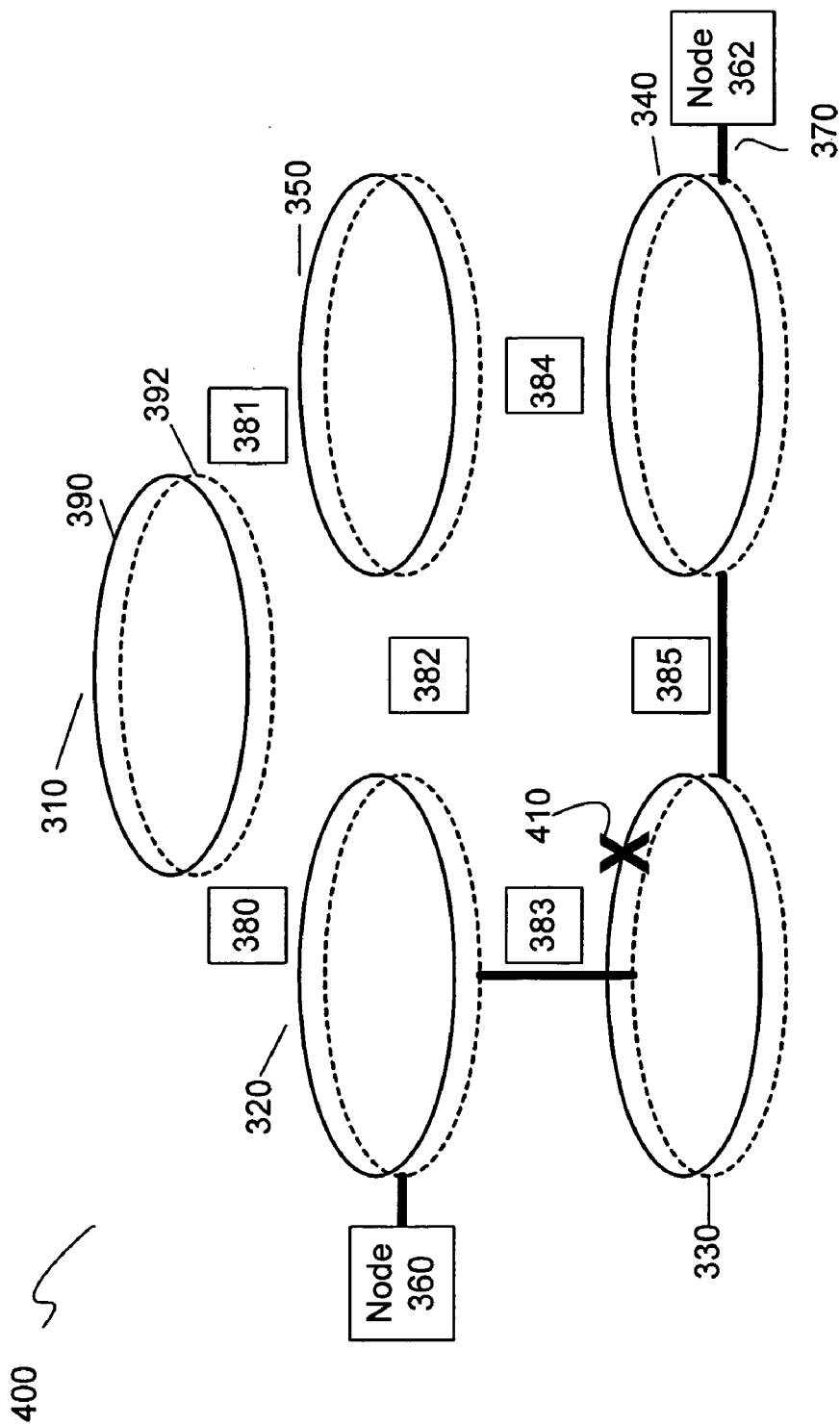
FIG. 4 illustrates a mesh network showing a ring failure in accordance with an embodiment of the present invention.

Referring to FIG. 4, a SONET network 400 is shown including a network failure ring 330 with break 410. More specifically, the working ring 390 of ring 330 suffered a network failure. Upon the detection of break 410, a SONET system with APS automatically drops traffic being transmitted via the protection portion of the ring 330 and transmits working-type traffic previously transmitted on working ring 390 to protection ring 392. The SONET Specification discloses that upon the detection of break 410, any traffic on the protection ring 392 of ring 330 is lost, and no restoration of such traffic is provided for.

Figure 5:
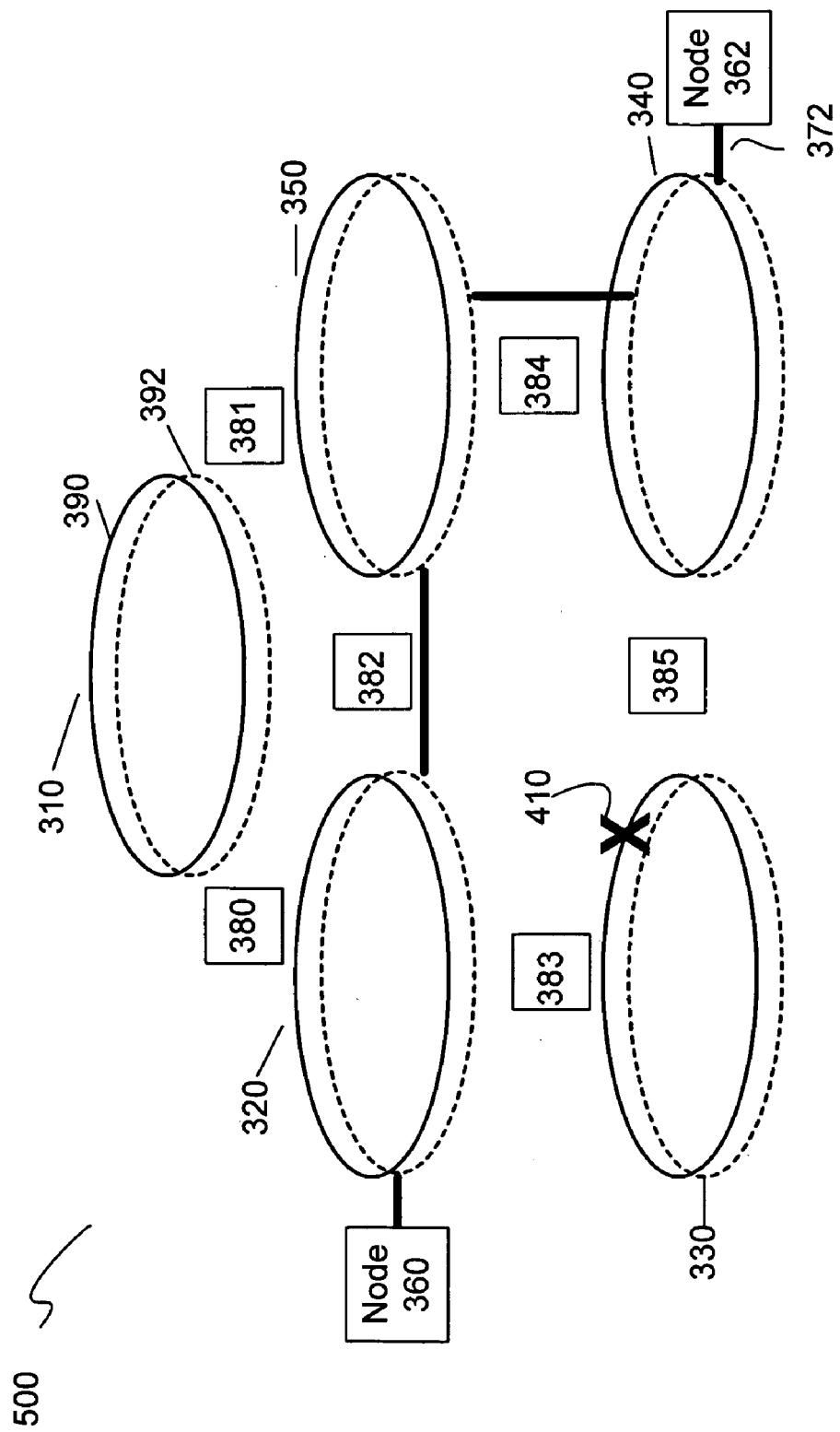
FIG. 5 illustrates a mesh network invoking mesh restoration for PCA traffic in accordance with an embodiment of the present invention.

Referring to FIG. 5, an embodiment of the present invention is shown in which PCA traffic routing is not stopped upon the switch from working to protect rings. Rather, an indication of an impending switch, according to an embodiment, invokes a mesh restoration, either centralized or distributed, that restores the PCA traffic through a mesh network. By seeking alternate paths, the network is restored by using other PCA routes. In one embodiment, PCA traffic also seeks available working routes. In this manner, the PCA traffic is protected from network failures causing SONET ring switches.

More specifically, the SONET network 500, according to an embodiment, uses an alternate protocol for PCA traffic to restore transmissions of traffic between node 360 and node 362 across protection rings. Thus, as shown in FIG. 5, route 372 is created upon a failure of the protection ring traffic of being transmitted. Route 372 is created using a method of mesh restoration. According to one embodiment, the restoration of protection ring traffic is accomplished using a protocol described in U.S. patent application entitled: "A Configurable Network Router," with inventors John C. Adler, Zareh Baghdasarian, Vahid Parsi, Ali Saleh, Ali, and Michael H. Zadikian, Ser. No. 09/232,395, filed on Jan. 15, 1999, incorporated herein in its entirety and for all purposes; and U.S. patent application entitled: "A Method for Routing Information Over a Network," with inventors Zareh Baghdasarian, Vahid Parsi, Ali Saleh, Ali, and Michael H. Zadikian, Ser. No. 09/232,397, filed on Jan. 15, 1999, incorporated herein in its entirety and for all purposes. Other protocols known in the art that are suitable for providing re-routing of protect traffic include multi-protocol lambda switching (MPλS), multi-protocol label system (MPLS), open-shortest path first (OSPF), and peer network to network interfacing (PNNI).

According to an embodiment of the present invention, a method of using one of the restoration protocols enables a carrier to complete a SONET ring network and restore PCA transmissions. More specifically, one of the restoration protocols connects traffic switches, such as wavelength routers, digital cross-connects, optical cross-connects, IP routers, and ATM switches to connect to PCA ports on the rings and mesh restoration is enabled. In one embodiment, the PCA is restored using a mesh status and control system that is communicated in-band. In-band refers to communications carried by the physical network layer, such as a SONET frame overhead byte. However, out-of-band communication channels can also be configured to carry status and control messages between network nodes.

In one embodiment of the invention, restoration of PCA is accomplished using a distributed intelligence for end-to-end provisions. In accordance with distributed intelligence, in one embodiment, event pipelining and parallel execution of protocol processes enables a distributed routing protocol, thereby minimizing event delays. Distributed routing optionally includes a distributed database with distributed control thereover.

In another embodiment of the invention, restoration of PCA is accomplished using a centralized intelligence. For example, according to an embodiment, a topology database contains information about all network nodes, their links, and available capacity. The topology database enables data to be transmitted using a mesh protocol.

Figure 6:
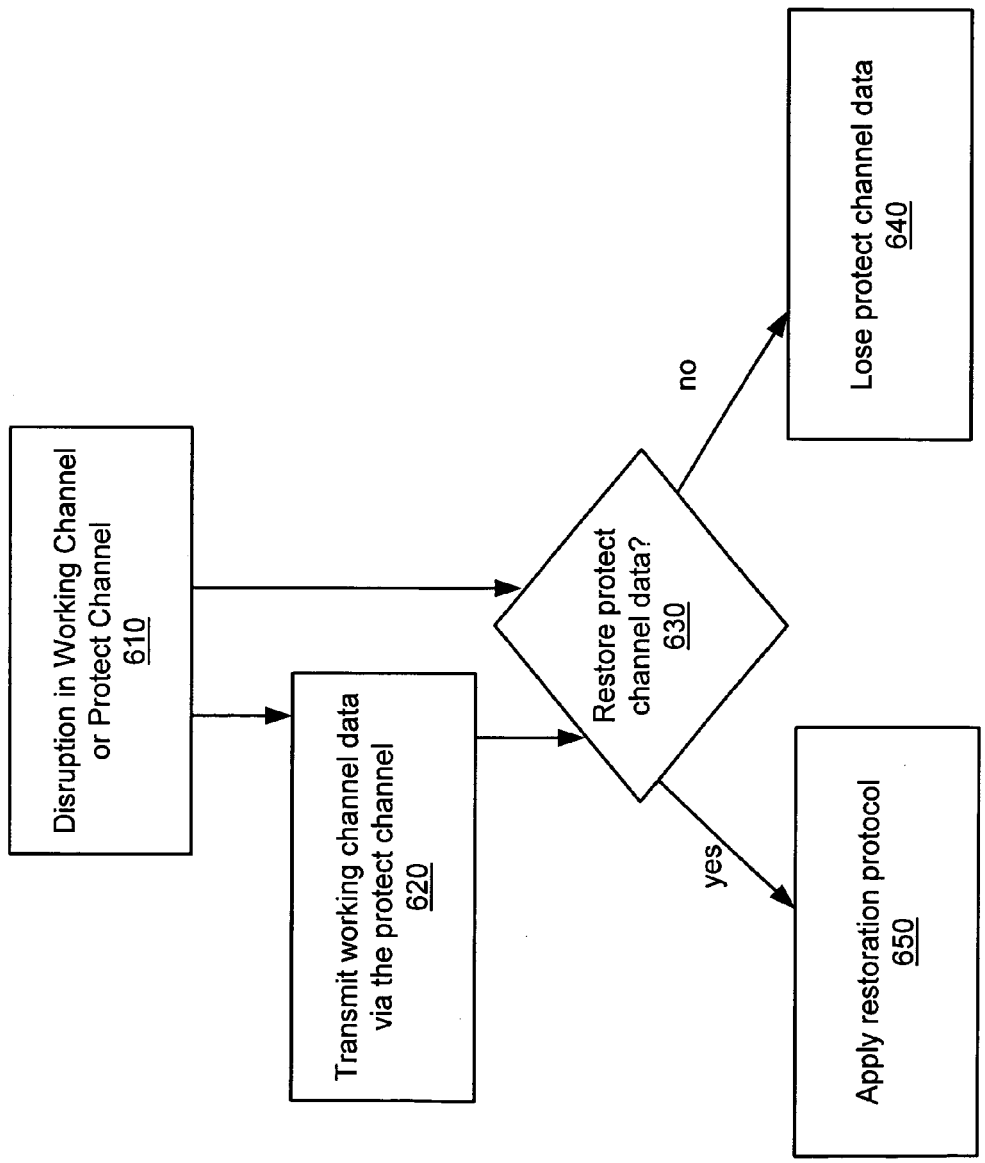
FIG. 6 illustrates a flow diagram in accordance with an embodiment of the present invention.

Referring now to FIG. 6, a method in accordance with an embodiment is provided. A method for a communications network includes a protect channel transmitting protect channel data and working channel transmitting working channel data. Block 610 provides that disruption in the working channel between two nodes occurs. More specifically, block 610 relates to receiving one of several types of notifications of a disruption. For example, according to the SONET specification, one type of disruption notification is referred to as a "signal fail". This type of disruption is considered a hard failure condition that clearly indicates that a disruption occurred. The disruption would include a break in a communication line and includes conditions such as a loss of signal, a loss of frame, line bit error rates exceeding, for example, $10^{-3}$, and like conditions. Another type of disruption notification includes a weak signal notification referred to in the SONET specification as a "signal degrade." This type of disruption includes a bit error rate that is either predefined or user-defined. The SONET specification provides that a bit error rate over the range $10^{-5}$ to $10^{-9}$ is user-provisionable. Other signal degradations are also included in identifying disruptions in communications. Such degradations are included in the SONET specification as warranting alarm indication signals (AIS). According to the SONET specification, AISs cover Line (AIS-L), Path (AIS-P) and virtual tributary level (AIS-V) disruptions.

Block 620 provides that the working channel data be transmitted via the protect channel, as is known in the SONET specification for automatic protection switching (APS). Block 630 provides for restoring the protect channel data. In one embodiment, the method provides for a choice in whether to restore protect channel data. For example, according to the SONET specification, protect channel data is lost in accordance with bock 640. According to another embodiment of the invention, protect channel data is not lost, but is restored using a restoration protocol. Whether to implement a restoration protocol depends on a user or predetermined criteria for interpreting a disruption signal. For example, the numerous types of disruption signals may be categorized as requiring implementing a mesh restoration protocol or not requiring implementing a mesh restoration protocol for restoring the protect channel data.

The restoration of protect channel data allows for communications companies and other carriers to transmit video, voice or internet protocol data via a protect channel, thereby increasing the throughput of data of the system over a more robust traffic channel than prior SONET systems. More specifically, block 650, in one embodiment, includes finding one or more alternate channels to transmit the protect channel data, the one or more alternate channels including connected working and protect channels. The alternate channels may include a plurality of interconnected nodes, such as those found in a ring formation with at least one of a working channel and a protect channel. Thus, protect channel data may be transmitted over working channels. For example, a carrier that desires a higher throughput of data being transmitted over the protect channel may opt for a mesh restoration protocol that includes redirecting protect channel data over less-used or available working channels.

According to one embodiment, the mesh restoration protocol includes receiving a signal indicating the disruption, the disruption signal flooding the communication network to determine alternate routes for the protect channel data. The disruption signal includes communicating status and control messages in overhead bytes of packets across a physical network layer of the communication network. When using overhead bytes, the communication system alternatively uses a distributed intelligence using a distributed routing protocol.

Another embodiment communicating the status and control messages across out-of-band communication channels. Thus, for example, instead of using a SONET network layer to communicate the disruption signals, an embodiment uses non-SONET communication systems to indicate disruptions and transmit status and control messages. Such out-of-band communications channels include internet protocol (IP) channels across non-SONET rings, as well as other SONET rings.

Figure 7:
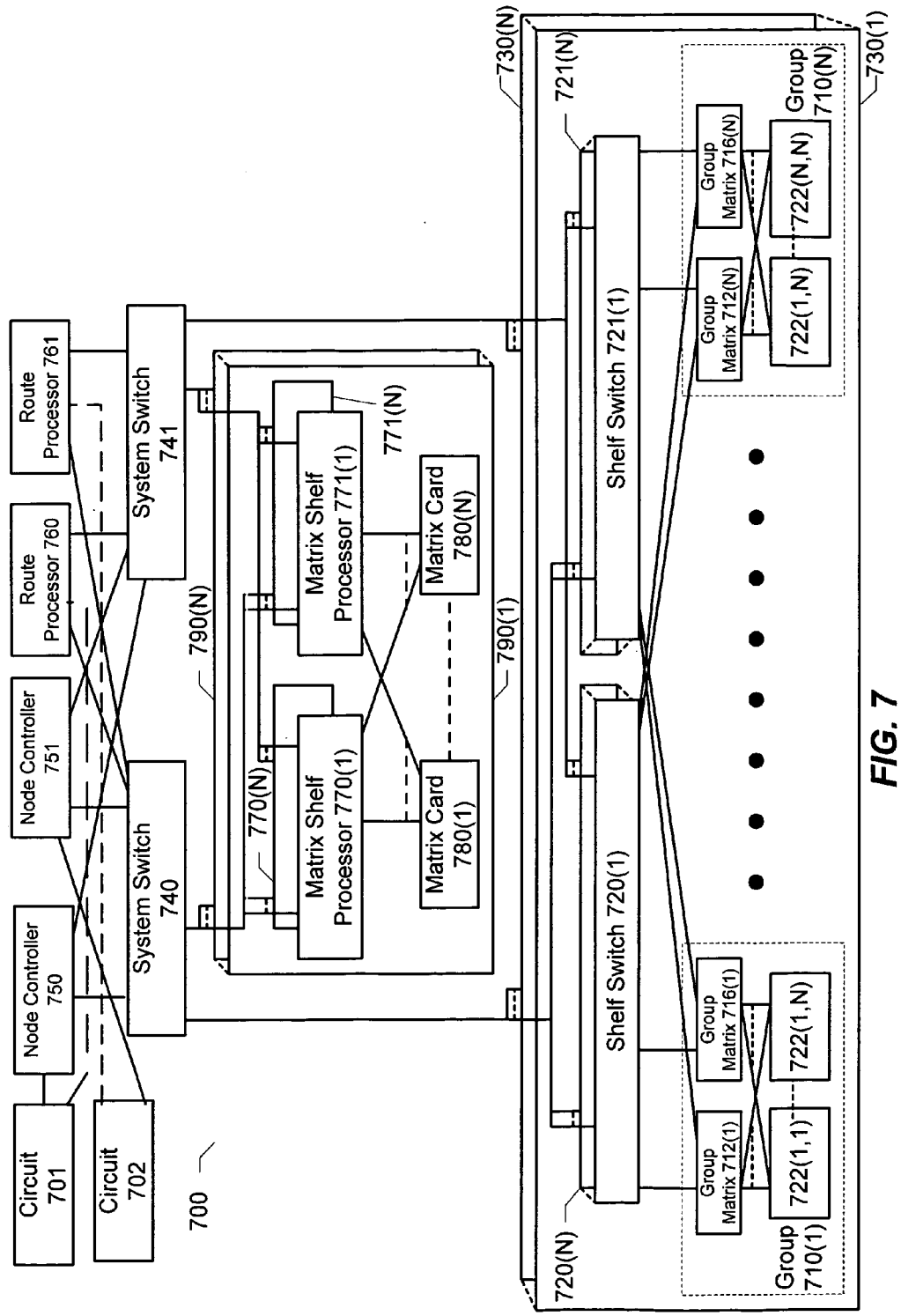
FIG. 7 illustrates a block diagram of an apparatus in accordance with an embodiment of the present invention.

Referring now to FIG. 7, a control path of an exemplary router in accordance with an embodiment. Control path 700 includes all non-payload-related flows within the system and the hardware and software necessary for the control of signal paths. All major control flows are carried over an internal local area network (LAN), which is, for example, a collection of switched Ethernet segments. The structure of the internal LAN is hierarchical and can be created using a mixture of 10 Mbps and 100 Mbps Ethernet segments, for example. Higher-speed segments (e.g., gigabit Ethernet) can be used as well.

At the bottom of the hierarchy is what is referred to herein as a group matrix, or a Group Ethernet Repeater in a system using Ethernet communications, and depicted in FIG. 7 as group matrices 712(1)–(N) and 716(1)–(N). Each one of group matrices 712(1)–(N) and 716(1)–(N), also referred to herein as a hub, a repeater, or concentrator, is a physical layer device and preferably supports a star network topology, such as the IEEE 802.3 10BASE-T networking standard. The redundant connections from line cards 720(1,1)–(N,N) in each of groups 710(1)–(N) are connected to two repeaters that reside on two separate copies of the group matrix module. Preferably, each one of line cards 720(1,1)–(N,N) supports two network ports (e.g., 10BASE-T Ethernet ports). The two sets of four signals from each port pass through a relay that selects one of them for connection to the LAN for purposes of redundancy. Groups 710(1)–(N) represent the first layer of the control bus hierarchy. Group matrices 712(1)–(N) and 716(1)–(N) are each controlled by a shelf processor (not shown, for the sake of clarity) and communicate with one of the shelf switches described below via LAN connections.

FIG. 7 also illustrates certain features of a router pertaining to the relationship between shelf switches 720(1)–(N) and 721(1)–(N), and groups 710(1)–(N). Groups 710(1)–(N) are again shown, with regard to the control functions thereof. In this depiction of groups 710(1)–(N), line cards 720(1,1)–(N,N) are shown as being attached to networking devices, indicated here as group matrices. Group matrices 712(1)–(N) and 716(1)–(N) may be, for example, multi-port Ethernet hubs running at 10 Mbps. Each of line cards 720(1,1)–(N,N) feed signals into two of group matrices 712(1)–(N) and 716(1)–(N). For example, line card 720(1,1) feeds received information to group matrices 712(1) and 716(1). Group matrices 712(1)–(N) and 716(1)–(N) each feed a signal into shelf switches 720(1)–(N) and 721(1)–(N). Shelf switches 720(1)–(N) and 721(1)–(N) are each controlled by a shelf processor (not shown for the sake of clarity) and communicate with one of the system switches (not shown, for the sake of clarity).

Shelf switches 720(1)–(N) and 721(1)–(N) are the next higher level of the control hierarchy in the exemplary router, and are located on the shelf processor module (exemplified by line racks (730(1)–(N)). Each copy of shelf switches 720(1)–(N) and 721(1)–(N) interconnects six connections from the three groups in each shelf, another connection from the shelf processor, and one connection from system switch 740 (and 741). Shelf switches 720(1)–(N) and 721(1)–(N) can be implemented, for example, using an 8-port Ethernet configured to handle 10 Mbps Ethernet traffic and a single-port, dual-rate switch (e.g., 10 Mbps/100 Mbps Ethernet).

The next level of the hierarchy is the system switch, of which there are two copies in each router. These are shown as system switches 740 and 741. This fully redundant scheme prevents failures on one switch from taking down the entire control bus. In one embodiment, a system switch manages connections from the following sources:

1. High-speed connection(s) from shelf switches 720(1)–(N) and 721(1)–(N);
2. High-speed connection(s) to higher-level processors (e.g., redundant node controllers 750 and 751, and redundant route processors 760 and 761); and
3. High-speed connection(s) to matrix shelf processors 770(1)–(N) and 771(1)–(N) which, in turn, control matrix cards 780(1,1)–(1,N)), located in main matrix racks 790(1)–(N).

It will be noted that main matrix 714 includes matrix cards 780(1,1)–(1,N), and that, more generally, main matrices 714 and 718 are included matrix racks 790(1)–(N).

System switches 740 and 741 are located in a management bay. As noted, the fully redundant switches manage connections from various router elements, such as I/O and matrix bays, node controllers, and route processors. Each of node controllers 750 and 751, and route processors 760 and 761 is preferably connected to system switches 740 and 741 using 100 Mbps Ethernet connections in a configuration that creates an expandable, efficient, and fully redundant control bus.

Each of line cards 720(1,1)–(N,N) receives optical signals from other network elements via a line-side optical receiver and from a local router's system via a system-side optical receiver. Each of these receivers implements an optical-to-electrical (O/E) conversion function. Each line card transmits optical signals to other network elements using a line-side optical transmitter and to the group matrices using a system-side optical transmitter. Each of these transmitters implements an electrical-to-optical (E/O) conversion function. It will be noted that line-side refers to the side of the line card coupled to other network elements and system-side refers to the side of the line card coupled to the group matrices.

Also shown in FIG. 7 are circuits 701 and 702, which implement an embodiment of the present invention. More particularly circuits 701 and 702, which are redundant circuits in keeping with the system of FIG. 7 are coupled to node controllers 750 and 751. Both circuits 701 and 702 include logic for determining restoration of protect channel data. More particularly, in an embodiment, each of circuits 701 and 702 include.

Circuits 701 and 702 are optionally controlled by user input to determine appropriate restoration criteria as described above with reference to FIG. 6. For example, circuit 701 and 702 may receive data concerning the bit error rate associated with the protect channel data over a ring. An input/output access (not shown) provides a user with monitoring and criteria management for determining appropriate restoration criteria. Circuits 701 and 702 also are coupled to route processors 760 and 761. According to an embodiment, route processors 760 and 761 provide mesh restoration software accessible to circuits 701 and 702 to implement mesh restoration of protect channel data. Circuits 701 and 702 include logic for receiving detection signals transmitted to node controllers 750 and 751 and logic for responding to the detection signals by applying the mesh restoration protocols in route processors 760 and 761 to protect channels. In one embodiment, circuit 701 and 702 operate as switches for directing route processors 760 and 761 to operate on protect channel data as well as working channel data under predetermined circumstances. Such predetermined circumstances may depend on a carrier's criteria for restoration of protect channel data. For example, a carrier transmitting video may have a different standard for throughput and bit error rates than a carrier transmitting voice or data. Accordingly, circuits 701 and 702 optionally include logic for determining the type of data being transmitted over the protect channel and implement restoration according to the level of protection required by the data transmitted. More specifically, in an embodiment, circuits 701 and 702 each include a logic gate for receiving signals identifying disruptions in transmissions in the protect channel and the working channel, and a switch responsive to the signals identifying disruptions in transmissions in the protect channel and the working channel, the switch communicating with the route processor to implement mesh restoration of protect channel data.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A method comprising:
   transmitting working channel data via a protect channel upon a disruption in a working channel, wherein prior to the disruption in the working channel, the working channel data had been transmitted over the working channel and protect channel data had been transmitted over the protect channel; and
   restoring transmission of the protect channel data on an alternate channel other than the protect channel by applying a mesh restoration protocol, wherein
      the alternate channel transmits the protect channel data from a first node to a second node via a mesh node, and
      wherein a first network comprises the first and second nodes,
      the mesh node is in a network other than the first network, and
      the network other than the first network is a second network.

2. The method of claim 1 wherein the mesh restoration protocol is a distributed mesh restoration protocol.

3. The method of claim 1 wherein the protect channel data includes at least one of video, voice and data.

4. The method of claim 1 wherein the alternate channel includes connected working and protect channels.

5. The method of claim 1 wherein the first network is one of a Synchronous Optical Network (SONET) and a Synchronous Digital Hierarchy (SDH).

6. The method of claim 1 wherein the second network includes a plurality of interconnected nodes, the interconnected nodes having at least one of a working channel and a protect channel.

7. The method of claim 6 wherein the plurality of interconnected nodes transmits a disruption signal upon receiving a signal indicating the disruption, the disruption signal flooding the second network to determine alternate routes for the protect channel data.

8. The method of claim 1 wherein the mesh restoration protocol includes communicating status and control messages across a physical network layer of the second network.

9. The method of claim 8, wherein the status and control messages are communicated using SONET frame overhead bytes.

10. The method of claim 1 wherein the mesh restoration protocol includes communicating status and control messages across out-of-band communication channels.

11. The method of claim 8, wherein the status and control messages are communicated via distributed intelligence using a distributed routing protocol.

12. An apparatus comprising:
    a node controller;
    a route processor coupled to the node controller, the route processor implementing a mesh restoration protocol;
    a circuit coupled to the node controller and the route processor, the circuit including:
       a logic gate for receiving signals identifying disruptions in transmissions in a protect channel and a working channel;
       a switch responsive to the signals identifying disruptions in transmissions in the protect channel and the working channel, the switch communicating with the route processor to implement mesh restoration of protect channel data, wherein
          the mesh restoration of protect channel data restores the protect channel data on a channel other than the protect channel by transmitting the protect channel data from a first node to a second node via a mesh node, and
          wherein a first network comprises the first and second nodes,
          the mesh node is in a network other than the first network, and
          the network other than the first network is a second network.

13. The apparatus of claim 12 wherein the circuit is coupled to at least one line card, the line card transmitting the signals identifying disruptions in transmissions in the protect channel and the working channel.

14. The apparatus of claim 12 wherein the circuit includes an input/output circuit for receiving instructions identifying criteria for applying mesh restoration to protect channel data.

15. The apparatus of claim 14 wherein the criteria are a function of the type of data being transmitted as the protect channel data.

16. The apparatus of claim 12 wherein the protect channel data includes at least one of voice, video and data.

17. The apparatus of claim 12 wherein the first network is one of a Synchronous Optical Network (SONET) and a Synchronous Digital Hierarchy (SDH).

18. The apparatus of claim 12 wherein the-second network includes a plurality of interconnected nodes, the interconnected nodes having at least one of a working channel and a protect channel.

19. The apparatus of claim 12 wherein the route processor communicates with a plurality of interconnected nodes and transmits a disruption signal upon receiving a signal indicating the disruption, the disruption signal flooding the second network to determine alternate routes for the protect channel data.

20. The apparatus of claim 19 wherein the route processor implements a mesh restoration protocol that includes communicating status and control messages across SONET overhead bytes of the communication network.

21. An apparatus comprising:
    means for receiving signals identifying a disruption in a working channel, the disruption causing the working channel data to be transmitted via a protect channel upon a disruption in the working channel; and means for restoring the transmitting of protect channel data coupled to the means for transmitting the working channel data, wherein the means for restoring includes means for applying a mesh restoration protocol to restore the transmittal of the protect channel data on a channel other than the protect channel by transmitting the protect channel data from a first node to a second node via a mesh node, and wherein a first network comprises the first and second nodes, the mesh node is in a network other than the first network, and the network other than the first network is a second network.

22. The apparatus of claim 21 wherein the protect channel data includes at least one of video, voice and internet protocol (IP) data.

23. The apparatus of claim 21 wherein the means for restoring further includes means for finding one or more alternate channels to transmit the protect channel data, the one or more alternate channels including connected working and protect channels.

24. The apparatus of claim 21 wherein the first-network is one of a Synchronous Optical Network (SONET) and a Synchronous Digital Hierarchy (SDH).

25. The apparatus of claim 21 wherein the-second network includes a plurality of interconnected nodes, the interconnected nodes having at least one of a working channel and a protect channel.

26. The apparatus of claim 25 wherein the plurality of interconnected nodes transmits a disruption signal upon receiving a signal indicating the disruption, the disruption signal flooding the second network to determine alternate routes for the protect channel data.

27. The apparatus of claim 21 wherein the apparatus is coupled to a node controller coupled to a line card, the line card being one of a plurality of line cards disposed in a management bay holding one or more line cards configured to transmit a plurality of signals.

28. The apparatus of claim 21 wherein the apparatus includes a plurality of circuits disposed in a plurality of linked nodes, each circuit coupled to a node controller associated with one of the plurality of linked nodes.

29. A computer program product encoded in a computer readable medium with executable program for a communications network including a protect channel transmitting protect channel data and working channel transmitting working channel data, the computer program product comprising:

transmit the working channel data via the protect channel upon a disruption in the working channel; and restore the transmitting of the protect channel data, wherein the restoring includes applying a distributed mesh restoration protocol to the communications network to restore the transmittal of the protect channel data on a channel other than the protect channel by transmitting the protect channel data from a first node to a second node via a mesh node, a first network comprises the first and second nodes, the mesh node is in a network other than the first network, and the network other than the first network is a second network.

* * * * *